US010378759B1

(12) United States Patent
Gogos et al.

(10) Patent No.: US 10,378,759 B1
(45) Date of Patent: Aug. 13, 2019

(54) TORCH, AND HOOD ASSEMBLY, WITH PROVISION FOR ATOMIZING FUEL FOR EASY COMBUSTION, AND PROVISION FOR AUTO-IGNITION OF FUEL

(71) Applicants: George Gogos, Lincoln, NE (US); Christopher A. Bruening, Lincoln, NE (US); Brian D. Neilson, Peoria, IL (US)

(72) Inventors: George Gogos, Lincoln, NE (US); Christopher A. Bruening, Lincoln, NE (US); Brian D. Neilson, Peoria, IL (US)

(73) Assignee: AGRICULTURAL FLAMING INNOVATIONS, LLC, Lincoln, NE (US)

( * ) Notice: Subject to any disclaimer, the term of this patent is extended or adjusted under 35 U.S.C. 154(b) by 166 days.

(21) Appl. No.: 15/731,568

(22) Filed: Jun. 30, 2017

(51) Int. Cl.
F23D 11/44 (2006.01)
F23D 14/38 (2006.01)
F23Q 3/00 (2006.01)
A01M 15/00 (2006.01)

(52) U.S. Cl.
CPC ........... F23D 11/445 (2013.01); A01M 15/00 (2013.01); F23D 14/38 (2013.01); F23Q 3/008 (2013.01)

(58) Field of Classification Search
CPC ....... F23D 11/445; F23D 14/38; A01M 15/00; F23Q 3/008
See application file for complete search history.

(56) References Cited

U.S. PATENT DOCUMENTS

| 565,551 | A | | 8/1896 | MacLachian | 83/238 |
| 600,106 | A | | 3/1898 | White | 43/28 |
| 1,322,454 | A | | 11/1919 | Matthews | 126/276.2 A |
| 1,433,885 | A | | 11/1919 | Fuller | 126/271.2 A |
| 1,346,770 | A | | 7/1920 | Sillet et al. | 431/245 |
| 1,466,417 | A | | 8/1923 | Adamson | 431/242 |
| 1,704,881 | A | | 2/1929 | Goldberg | 126/38 |
| 1,735,151 | A | | 11/1929 | Blaskewitz et al. | 126/38 |
| 1,771,346 | A | | 7/1930 | Blaskewitz et al. | 431/11 |
| 1,819,619 | A | | 8/1931 | Blaskewitz et al. | 431/209 |
| 2,237,704 | A | | 4/1941 | McLemore | 210/773 |
| 2,408,328 | A | | 9/1946 | McLemore | 47/1.44 |
| 2,601,895 | A | * | 7/1952 | Garretson | A01M 15/00 |
| | | | | | 126/271.2 R |

(Continued)

OTHER PUBLICATIONS

US 2005/0084409 by Pivonka, Apr. 2005, U.S. Appl. No. 10/687,854, filed Oct. 2003.

(Continued)

Primary Examiner — Alfred Basichas
(74) Attorney, Agent, or Firm — James D. Welch

(57) ABSTRACT

A torch comprising a functional combination of:
1) an ignition system having an internal bluff body wall, said ignition system having an open end and an end in which is present a spark plug; and
2) an elongated fuel line that is secured to said torch so that heat easily passes from hot gas and flame inside said torch thereinto during use, wherein the fuel line has a fuel flow "swirl" producing element therewithin; and
3) a thermocouple secured in place inside the torch to monitor temperature at a relatively high temperature location therein, such that if the temperature decreases while fuel is still flowing a signal is generated to provide a spark to the spark plug.

17 Claims, 12 Drawing Sheets

(56) References Cited

U.S. PATENT DOCUMENTS

| | | | |
|---|---|---|---|
| 2,643,709 A | 6/1953 | Haverland | 431/263 |
| 3,164,927 A | 1/1965 | Holloway | 47/1.44 |
| 3,168,133 A | 2/1965 | Zoschak | 431/263 |
| 3,357,474 A | 12/1967 | Pivonka | 431/240 |
| 3,477,174 A | 11/1969 | Lalor | 47/1.44 |
| 3,485,567 A | 12/1969 | Hutchinson et al. | 431/210 |
| 3,543,436 A | 12/1970 | Baxter | 47/1.44 |
| 3,626,636 A | 12/1971 | Wheeler | 47/5 |
| 3,805,766 A | 4/1974 | Hammon | 126/271.2 |
| 3,807,938 A | 4/1974 | Hastings | 431/123 |
| 3,876,364 A | 4/1975 | Hefling | 431/123 |
| 4,034,739 A | 7/1977 | Boekelman | 126/271.2 |
| 4,223,723 A | 9/1980 | Hilal | 165/133 |
| 4,420,901 A | 12/1983 | Clarke | 126/271.2 |
| 4,869,235 A | 9/1989 | Miles et al. | 126/271.2 R |
| 4,946,384 A | 8/1990 | London | 431/349 |
| 4,991,342 A | 2/1991 | Maher et al. | 47/1.7 |
| 5,030,086 A | 7/1991 | Jones | 431/207 |
| 5,189,832 A | 3/1993 | Hoek et al. | 47/1.44 |
| 5,336,084 A | 8/1994 | Long | 431/354 |
| 5,417,565 A | 5/1995 | Long | 431/231 |
| 5,520,535 A | 5/1996 | Heilman | 431/263 |
| 5,682,707 A | 11/1997 | Chastain | 47/1.44 |
| 5,768,822 A | 6/1998 | Harrell | 43/144 |
| 5,826,371 A | 10/1998 | Benjamin | 47/1.44 |
| 5,921,324 A | 7/1999 | Anderson | 172/176 |
| 6,014,835 A | 1/2000 | Pivonka | 47/1.44 |
| 6,363,645 B1 | 4/2002 | Prull | 47/1.44 |
| 6,363,654 B2 | 4/2002 | Prull | 47/1.44 |
| 6,505,437 B1 | 1/2003 | Johnstone et al. | 47/1.44 |
| RE39,636 E | 5/2007 | Brown | 47/1.44 |
| 7,472,512 B2 | 1/2009 | Chang et al. | 43/132.1 |

OTHER PUBLICATIONS

US 2012/0051489 by Varanaski et. al, Mar. 2012, App. No. 872,353 Filed Aug. 2010.
US 2010/0024291 by Jensen, Feb. 2010, App. No. 530,129 Filed Feb. 2008.
"Technical Aspects of Flame Weeding in Louisianna", Thomas, Proc. of First Annual Flame Sysmposium, Memphis, TN (1964).
US 2005/0262761, by Carrol et al., Dec. 2005, U.S. Appl. No. 10/855,701, filed May 2004.
"Development of a Flame Weeder", Kang, Transaction of the ASAE, vol. 44 (5), pp. 1065-1070, (2001).
Development of a Flame Weeder, Kang, Transactions of the ASAE, vol. 44 (5), pp. 1065-1070, (2001).
LP-Gas for Weed, Nematode and Pathogen Control in Agriculture, PR Commission of Texas, Final Rep0ort, (Jun. 30, 2001).

* cited by examiner

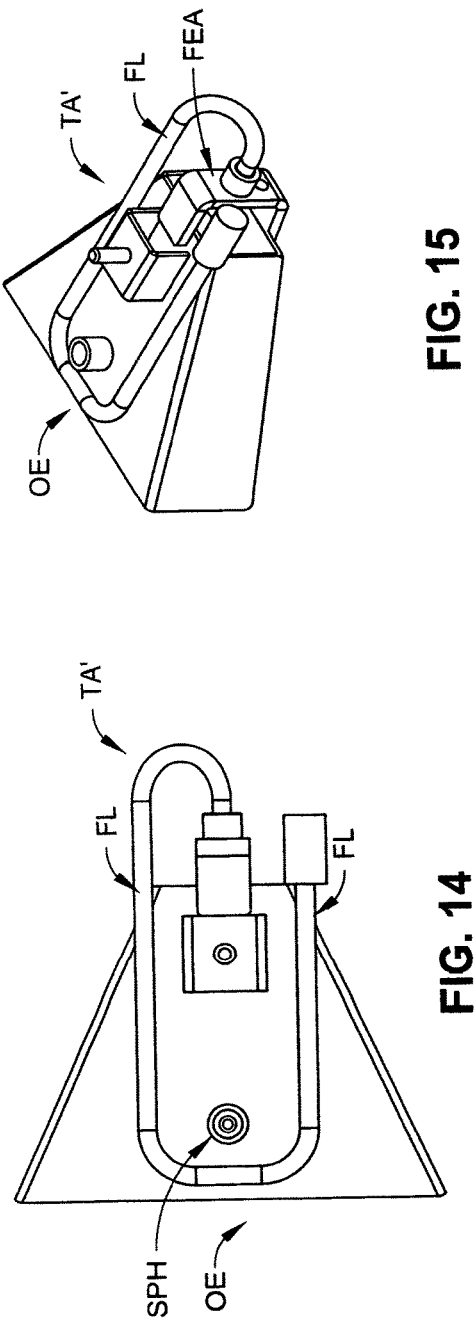
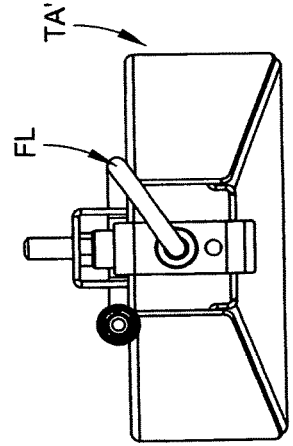
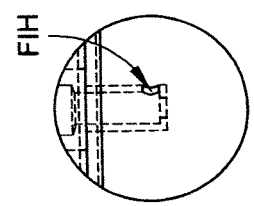
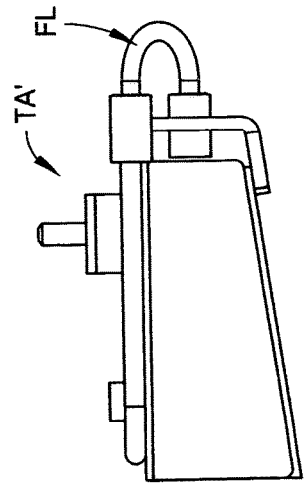
FIG. 14
FIG. 15
FIG. 16
FIG. 17
FIG. 18

TORCH, AND HOOD ASSEMBLY, WITH PROVISION FOR ATOMIZING FUEL FOR EASY COMBUSTION, AND PROVISION FOR AUTO-IGNITION OF FUEL

TECHNICAL FIELD

The present invention relates to torch and hood assemblies for use in crop flaming, and more particularly and specifically to a torch having an opening for receiving an end of an elongated fuel line at one end thereof, said received end of said fuel line being attached to a fuel nozzle which is secured to the interior of said torch, said torch further being open at a longitudinally forward distal end thereof, said torch being otherwise substantially closed on top, bottom and left and right sides, said torch being characterized by comprising in functional combination:

- an ignition system comprising a bluff body wall projecting interiorly into said torch from said top, and being positioned forwardly distal from the opening for receiving said fuel line, said ignition system further having an opening in the top for receiving a spark plug; and
- said ignition system further comprising, during use, a spark plug present in said opening for receiving such, and exterior to said torch, a high voltage spark coil which when functionally applied provides a high voltage to said spark plug; and
- said elongated fuel line being secured to the outside of said torch such that heat can pass from hot gas and flame inside said torch thereinto during use, said fuel line having a fuel flow "swirl" producing element therewithin that enters turbulence into fuel passing therethrough to thereby enable efficient transfer of heat from said torch to liquid fuel therewithin by disrupting formation of a gaseous insulating layer between said liquid fuel and the elongated fuel line; and
- a thermocouple, optionally secured to said ignition system bluff wall and positioned so that it intercepts a relatively high temperature region in said torch.

The present invention also comprises methods of use of the torch-hood assembly in crop cultivation and tilling.

BACKGROUND

Flaming serves as an alternative to use of pesticides and is an organic process for eliminating and suppressing of weeds and pests (eg. insects), in agricultural settings. High temperatures are applied to plants and pests to cause cell membranes to rupture, leading to weed and pest death. Cell rupture occurs at about 100 degrees Centigrade, and can be accomplished, for instance, by exposing weeds and pests to about 800 degrees Centigrade for about 0.1 second. A reference that discloses a range of 0.065 to 0.13 seconds at temperatures between 800 and 900 degrees Centigrade is "Technical Aspects of Flame Weeding", Louisiana Proc. First Annual Symposium: Research on Flame Weed Control, 28-33, Sponsored by Natural Gas Processors Assoc., Memphis, Tenn., Thomas, C. H., (1964).

Currently, flaming is applied in organic and conventional farming, but has potential for far greater application in conventional farming than is now the case.

A known problem in applying flaming in conventional farming is that simple propane burning systems and state of the art torch-hood assemblies are inefficient.

A Professional Search of Patents in the area has identified:
U.S. Pat. No. 6,505,437 to Johnstone et al.;
U.S. Pat. No. 6,363,654 to Prull;
U.S. Pat. No. 5,768,822 to Harrell;
U.S. Pat. No. 5,682,707 to Chastain;
U.S. Pat. No. 5,189,832 to Hoek et al.;
U.S. Pat. No. 5,030,086 to Jones;
U.S. Pat. No. 4,420,901 to Clark;
U.S. Pat. No. 4,034,739 to Boekelman;
U.S. Pat. No. 3,805,766 to Hammon;
U.S. Pat. No. 3,626,636 to Wheeler;
U.S. Pat. No. 3,164,927 to Hollovay;
U.S. Pat. No. 1,322,459 to Mattern; and
Published Application No. US2005/0262761 by Carrol et al.

Other known Patents are:
U.S. Pat. No. 1,433,885 to Fuller;
U.S. Pat. No. 600,106 to White; and U.S.
U.S. Pat. No. 3,477,174 to Lalor.

Additional Patents identified by a Computer Search are:
U.S. Pat. No. 5,921,324 to Anderson;
U.S. Pat. No. 7,472,512 to Chang et al.;
Pat. No. RE39,636 to Brown;
U.S. Pat. No. 6,014,835 to Pivonka; and
Published Application No. US2005/0084409 by Pivonka.

Additional Searching for Patents that describe ignition systems that could be applied to flame-weeding provided:
U.S. Pat. No. 4,946,384 to London;
U.S. Pat. No. 3,168,133 to Zoschak;
U.S. Pat. No. 2,643,709 to Haverland;
U.S. Pat. No. 5,520,553 to Heilman.

And, further Searching for Patents and Published Applications that describe heat transfer systems that could be applied to fuel lines in weed flaming systems provided:
U.S. Pat. No. 4,223,723 to Hilal;
U.S. Pat. No. 6,505,437 to Johnstone et al.;
Published Application US2012/0051489 by Varanaski et al.;
Published Application US2010/0024291 by Jensen.

A professional Search was conducted for the use of fuel lines with flow affecting elements therewithin, and identified:
U.S. Pat. No. 3,807,938 to Hastings;
U.S. Pat. No. 3,485,567 to Hutchinson et al.;
U.S. Pat. No. 5,417,565 to Long;
U.S. Pat. No. 5,336,084 to Long;
U.S. Pat. No. 3,876,364 to Hefling;
U.S. Pat. No. 3,357,474 to Pivonka;
U.S. Pat. No. 1,819,669 to Blaskewitz et al.;
U.S. Pat. No. 1,770,346 to Blaskevitz et al.;
U.S. Pat. No. 1,735,151 to Blaskewitz et al.;
U.S. Pat. No. 1,701,881 to Goldberg;
U.S. Pat. No. 1,466,417 to Adamson;
U.S. Pat. No. 1,346,770 to Sillett et al.; and
U.S. Pat. No. 565,551 to MacLachlan.

In addition, a Report titled "LP-Gas for Weed, Nematode and Pathogen Control in Agriculture", released by the Railroad Commission of Texas Jun. 30, 2004 was identified.

It is also noted that, while not disclosed in this Specification, different "recipes, (eg. gallons of propane used per acre and flame application times etc.), are beneficially varied for application to different crops.

In addition, while it is known that the presently disclosed invention system is more efficient as regards the use of propane to achieve desired weed and/or pest control, (eg. less than 50% propane required as compared to requirements of other known flaming systems which do not incorporate hoods), the exact data regarding this are not yet available but rather will be presented in Continuation In Part Applications. A reason the present invention system demonstrates better efficiency, however, is known. Its design allows for greater intake of oxygen during operation, therefore enables better, clean, reduced pollution creating combustion. And, because in use the present invention torch is applied in combination with hoods that keep naturally rising heat closer to the ground for longer periods, a present invention torch-hood system can be applied more efficiently, even in windy conditions which cause problems for other known system. Further, flaming can be performed in fields which are too wet to be cultivated by conventional mechanical techniques.

It is further disclosed that the current practice of using chemicals to control pests and/or weeds in crop fields is threatened as resistance thereto has been developing (eg. pigweed has been especially successful in this regard). The present invention enables pest and/or weed control without this problem ever developing as weeds and/or pests will not, in the forseeable future, develop absolute resistance to flaming, although some grasses and foxtail are less susceptible thereto than are, for instance broadleaf weeds such as pigweed. Fortuitously it is the broadleaf weeds that present the greatest present time problem in crop production. Further, conventional mechanical cultivation leads to loss of approximately 1" of water each time it is performed. Flaming avoids this, as well as the soil erosion that can occur when conventional mechanical cultivation and post planting tilling is performed.

Provisional Application Ser. Nos. 61/741,594 Filed Jul. 25, 2012 and 61/741,618 Filed Jul. 25, 2012 are incorporated by reference in this Application as is a Masters of Science Thesis, by inventor Neilson, titled "The Integration of Propane Flaming and Mechanical Cultivation for Effective Weed Control in Agriculture", Neilson, Univ. of Nebraska, May 2012. (Note, the Neilson Thesis was made available in the Card Catalog or computer equivalent at the University of Nebraska Library on Apr. 26, 2012. Also, it mentions various Patents in it's Background Section, but does not provide numbers therefore. Only two thereof were found and are U.S. Pat. Nos. 2,237,204 and 2,408,328. There is no intent to withhold other Patents mentioned therein, but being from the 1940's or there abouts, they simply have not been found using typical searching techniques).

Even in view of the known prior art, need remains for an improved mobile system comprising hoods, in functional combination with improved torch assemblies.

DISCLOSURE OF THE INVENTION

The present invention is primarily a torch, said torch having an opening for receiving an end of an elongated fuel line at one end thereof, said received end of said fuel line being attached to a fuel nozzle. Said torch is further open at a longitudinally forward distal end thereof, and said torch is otherwise substantially closed on top, bottom and left and right sides. Said torch, as viewed from a position vertically atop thereof, is generally rectangular, or wedge shaped with an increasing dimension longitudinally from the end thereof at which the fuel line enters, to the forward open end. Said torch is characterized in that it comprises three elements in functional combination, said three elements being:

1. an ignition system comprising a bluff body wall projecting interiorly thereinto from said top, and being positioned forwardly distal from the opening for receiving said fuel line, said ignition system further having an opening in the top thereof for receiving a spark plug; said ignition system further comprising, during use, a spark plug present in said opening for receiving such, and exterior to said torch a high voltage spark coil which when functionally applied provides a high voltage to said spark plug; and 2. said elongated fuel line being secured to the outside of said torch such that heat can pass from hot gas and flame inside said torch thereinto during use, said fuel line having a fuel flow "swirl" producing element therewithin that enters turbulence into fuel passing therethrough to thereby enable efficient transfer of heat from said torch to liquid fuel therewithin by disrupting formation of a gaseous insulating layer between said liquid fuel and the elongated fuel line; and 3. a thermocouple and positioned thereby so that it intercepts a relatively high temperature region inside said torch, said thermocouple being optionally secured to said ignition system bluff body wall.

In use liquid fuel is caused to flow through said elongated fuel line and exit into the interior of said torch assembly via said fuel nozzle, and such that in use, said ignition system is simultaneously operated to the end that said spark plug causes a spark to occur at a location forwardly distal to the bluff body, said bluff body serving to slow the velocity of said fuel exiting said nozzle such that reliable ignition of said fuel is achieved. Further, said thermocouple, which is optionally secured in position with respect to said bluff body wall, senses the presence of a temperature related to the burning of fuel inside said torch assembly and provides a signal to provide a spark to said spark plug should that temperature significantly decrease while fuel is still flowing, thereby indicating flame extinction.

Said torch assembly can provide that the elongated fuel line is welded to the exterior thereof and the opening for receiving a spark plug is located approximately centrally in a lateral direction between said left and right sides, and in said longitudinal direction projecting from said fuel entry opening toward the distal open end of the torch assembly. However, said bluff body can be other than centrally located and remain within the scope of the invention.

Said torch assembly can provide that the fuel flow "swirl" is effected by the presence of a spring that is inserted into said elongated fuel line which has an outer dimension substantially equal to an inner dimension of said elongated fuel line.

Alternatively, the torch assembly can provide that the fuel flow "swirl" is effected by the presence of a plurality of twisted wires that are inserted into said elongated fuel line that have a combined outer dimension substantially equal to an inner dimension of said elongated fuel line.

As a further alternative, said torch assembly can provide that the fuel flow "swirl" is effected by the presence of a twisted helical shaped blade that is inserted into the elongate fuel line that has an outer dimension substantially equal to an inner dimension of said elongated fuel line.

The present invention further comprises a torch-hood assembly.

The hood comprises:
substantially open back and front ends, and a selection from the group consisting of:
a closed top and closed sides;
a closed top and at least one open side; and
an at least partially open top and closed sides.

Said torch-hood assembly further has at least one torch associated therewith for producing flame and directing it into said substantially open back end of said hood,
such that in use said at least one torch is positioned so that it provides a flame directed into the open back of said hood.

Said at least one torch is described earlier herein regarding the preferred embodiment, but more generally can comprise an enclosed, but for an opening for receiving an end of an elongated fuel line at one end thereof, and being open at an end longitudinally distal therefrom. Said torch is substantially closed on top, bottom and sides thereof. It is noted that the opening for receiving and end of the elongated fuel line does not secure said fuel line snugly therewithin, but provides an open area therearound, (eg. annular shaped), through which primary air enters to support combustion inside said torch. Importantly, said torch further comprises at least one selection from the group consisting of:

inside said torch an ignition system comprising a bluff body wall, said ignition system having an open end and an end in which is present a spark plug, said ignition system further comprising a high voltage spark coil functionally applied to, during use, provide high voltage to said spark plug; and an elongated fuel line that is secured to the outside of said torch so that heat easily passes from hot gas and flame inside said torch thereinto during use, said fuel line having a fuel flow "swirl" producing element therewithin that enters turbulence into fuel passing therethrough to thereby enable efficient transfer of heat from said torch to liquid fuel therewithin by disrupting formation of a gaseous insulating layer between said liquid fuel and the elongated fuel line.

Said torch-hood assembly can include said ignition system, and further comprise a thermo-couple mounted in said torch-hood assembly which monitors the temperature inside said torch-hood assembly, such that when said temperature decreases as a result of the loss of combustion of fuel therewithin causes, via a processor control, said spark plug to receive a high voltage to the end that a fuel igniting spark is caused by said spark plug.

Said torch-hood assembly can include said elongated fuel line, in which the fuel flow "swirl" affecting element is a spring, (eg. helical spring), that is inserted therethrough that has an outer dimension substantially equal to an inner dimension of said elongated fuel line. Other swirl creating elements that can be inserted through the fuel line are a plurality of twisted wires and a helix shaped blade.

The present invention torch-hood assembly can include both:

inside said torch an ignition system comprising a bluff body wall, said ignition system having an open end and an end in which is present a spark plug, said ignition system further comprising a high voltage spark coil functionally applied to, during use, provide high voltage to said spark plug; and an elongated fuel line that is secured to the outside of said torch so that heat easily passes from hot gas and flame inside said torch thereinto during use, said fuel line having a fuel flow "swirl" producing element therewithin that enters turbulence into fuel passing therethrough to thereby enable efficient transfer of heat from said torch to liquid fuel therewithin by disrupting formation of a gaseous insulating layer between said liquid fuel and the elongated fuel line.

Said torch can have said elongated fuel line welded to the top thereof, and the "swirl" producing element can be a spring inserted through the inside of the fuel line, or can be a plurality of twisted wires, or a blade twisted into a helix, inserted therethrough, or even a combination of said elements. In all cases the outer diameter of the element inserted through the fuel line is approximately equal to the inner diameter of the fuel line.

It is also noted that the ignition system bluff body wall can be in the form of a circumscribing open bottom tubular shape or of a half tube shape. In all cases, an optional hole through the wall, when present, faces the opening for receiving the elongated fuel line, which provides fuel flow therethrough in use so that and is reliably ignited. It is to be understood that, especially where a half tube shape bluff body wall is used, a hole through the wall is not absolutely necessary. A bluff body wall can be of any functional shape, (eg. rectangular shape).

Additionally, it is to be understood that fuel entering the fuel line is typically liquid and exits said fuel line, (after combustion is established), typically via a nozzle which is affixed to said fuel line, as a high speed vapor. This encourages clean easy burning as evidenced by a blue flame. If the fuel exiting the nozzle is not a vapor, (eg. before combustion is established and provides vaporizing heat to the fuel line), it burns with an orange color and is polluting. It has been found that for flow rates less than that caused by a about a non-limiting 90 PSI input pressure, fuel exiting the present invention fuel line is indeed a vapor.

A method of flame cultivating and tilling a crop comprises the steps of:

a) providing a field and a tractor;

a') providing a fuel tank, pressure regulator and solenoid valve control system for controlling fuel exit from said fuel tank;

a") providing at least one torch-hood assembly comprising:

substantially open back and front ends, and a selection from the group consisting of:
a closed top and closed sides;
a closed top and at least one open side; and
an at least partially open top and closed sides;

said torch-hood assembly having at least one torch associated therewith for producing flame and directing it into said substantially open back end of said hood, said torch having its longer dimension oriented to provide a wide flaming zone, (eg. its longer open end dimension is oriented more parallel to the ground than it is perpendicular thereto);

such that in use said at least one torch is positioned so that it provides a flame directed into the back of said torch-hood assembly;

said torch being closed but for an opening for receiving an end of an elongated fuel line at one end thereof and being open at an end distal therefrom, said torch being closed on top, bottom and sides thereof, said torch further comprising:

inside said torch an ignition system comprising a bluff body wall, said ignition system having an open end and an end in which is present a spark plug, said ignition system further comprising a high voltage spark coil functionally applied to, during use, provide high voltage to said spark plug; and an elongated fuel line that is secured to the outside of said torch so that heat easily passes from hot gas and flame inside said torch thereinto during use, said fuel line having a fuel flow "swirl" producing element therewithin that enters turbulence into fuel passing therethrough to thereby enable efficient transfer of heat from said torch to liquid fuel therewithin by disrupting formation of a gaseous insulating layer between said liquid fuel and the elongated fuel line. b) configuring said tractor, fuel tank, pressure regulator and solenoid valve control system and at least one torch-hood assembly so that said tractor is attached to said fuel tank, pressure regulator and solenoid valve control system and torch-hood assembly in a manner that allows said tractor to pull said fuel tank, pressure regulator and solenoid valve control system and torch-hood assembly through said field, and attaching said solenoid valve to said fuel tank through said pressure regulator and to the fuel line of at least one torch, and configuring said hood assembly to have closed top and closed sides, controls for operating said solenoid and ignition system of said at least one torch-hood assembly also provided so that they are accessible from said tractor;

c) from said tractor causing said solenoid valve to allow fuel to flow therethrough into said at least one torch fuel line, and from said tractor operating said ignition system spark plug in said at least one torch so that said torch receives fuel, causes it to burn and enters heat into said at least one hood;

d) causing said tractor to pull said fuel tank, pressure regulator and solenoid valve control system and at least one torch-hood assembly through said field.

Said method can further comprise:

e) planting and allowing a row crop to grow to a height of at least a few inches tall;

f) reconfiguring said at least one hood assembly so that at least a central portion of the top thereof is removed to provide an open area therewithin, and so that there are two torches present therewithin, one to the right and one to the left of a longitudinal line that divides the hood into right and left parts, said two torches having a central distance present therebetween appropriate to straddle said row crop to provide banded flaming, and orienting said torches to provide a narrow flaming treatment zone, (eg. its longer open end dimension is oriented more perpendicular to the ground than it is parallel thereto);

g) operating said solenoid valve system from said tractor, and the two ignition system spark plugs in the two torches, and causing said tractor to pull said fuel tank, pressure regulator and solenoid valve control system and two torch-hood containing assembly through said field with one of said two torches providing heat primarily to one side of said row crop, and the second of said torches providing heat primarily to the other side of said row crop.

And said method can further comprise, where a row crop is of a limited length, and when said tractor has pulled the fuel tank, pressure regulator and solenoid valve control system and two torch-hood containing assembly through said field, with one of said two torches providing heat primarily to one side of said row crop, and the second of said torches providing heat primarily to the other side of said row crop, and where the end of said limited length is reached, practicing step h):

h) said solenoid valve is operated from said tractor to end the flow of fuel into said two torches.

And said method can further involve, where the tractor is caused to orient the fuel tank, pressure regulator and solenoid valve control system and two torch hood containing assembly to provide heat to the same or a different row of said row crop, practicing step i):

i) from said tractor causing the solenoid valve and ignition system spark plugs of said two torches to operate so that fuel flows into said two torches and ignites so that one of said two torches provides heat one side of said same or different row and the other torch provides heat to the other side of said same or different row of said row crop, as said tractor is caused to pull said fuel tank, pressure regulator and solenoid valve control system and two torch-hood through said field.

It is to be understood that present invention torch-hood assemblies can be constructed as new equipment, or retrofitted to existing conventional mechanical systems. Further, present invention torch-hood assemblies can be constructed to provide numerous adjustments of torch and hood orientations, (eg. torch oriented to direct wide or narrow flaming treatment zones, and direct flame locus directly at, or at angles to the ground), from various heights above ground, (eg. for use with crops that can be, for instance, non-limiting exemplary 22, 30, 36, 38 etc. inches apart). Additional adjustment capability can provide that the same system can perform both inter-row and intra-row flaming, depending on configuration.

The invention will be better understood by reference to the Detailed Description Section of this Specification, in conjunction with the Drawings.

BRIEF DESCRIPTION OF THE DRAWINGS

as shown in FIGS. 6-8 for one Torch Design (TA), and FIGS. 14-18 show similar detail for an alternative Torch Design (TA').

FIGS. 19A and 19B show longitudinal and lateral cross-sectional view details of the inside of a preferred fuel line (FL) having a spring inserted therethrough.

FIGS. 19C and 19D show longitudinal and lateral cross-sectional views of the inside of a preferred fuel line (FL) having twisted wires inserted therethrough.

FIGS. 19E and 19F show longitudinal and lateral cross-sectional views of the inside of a preferred fuel line (FL) having a twisted blade inserted therethrough.

DETAILED DESCRIPTION

Figure 1:
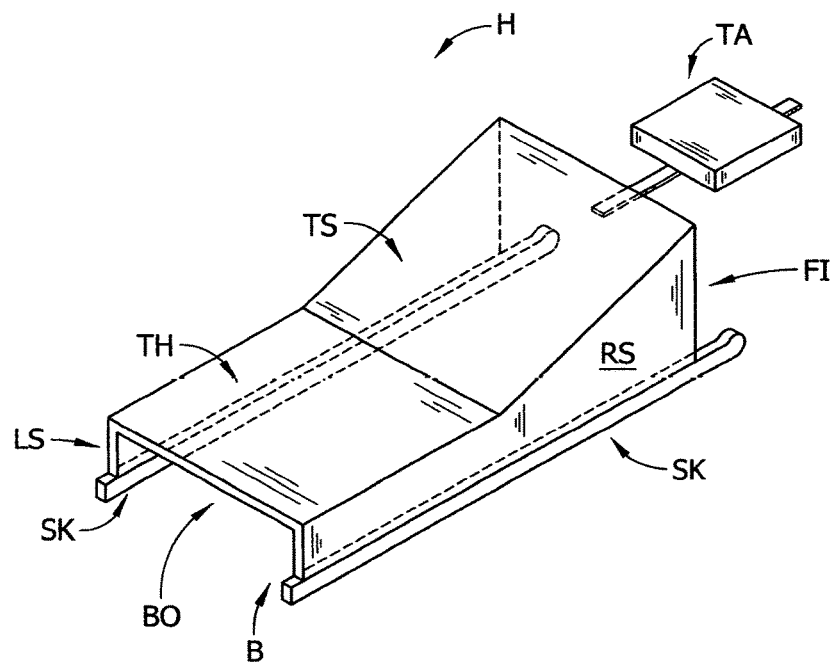
FIG. 1 shows a three dimensional view of a present invention Hood (H) and Torch Assembly (TA).
Figure 2:
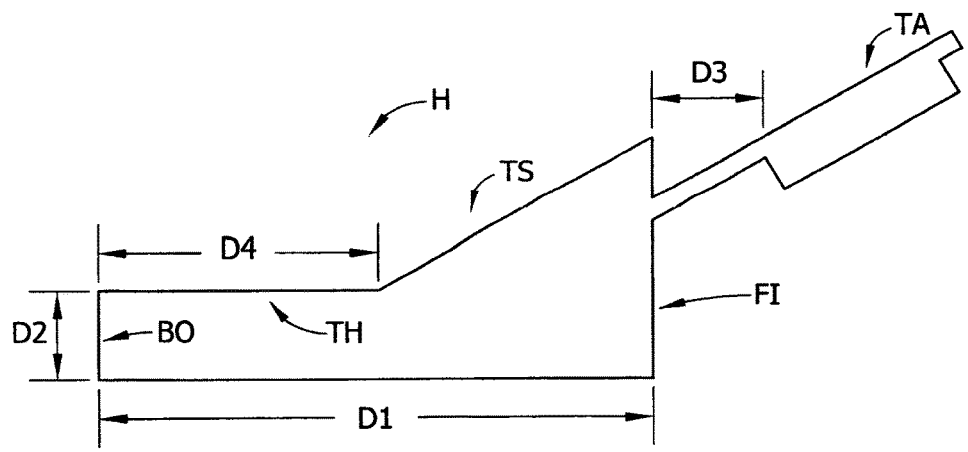
FIG. 2 shows a side elevational view of the present invention Hood (H) and Torch Assembly (TA), (ie. (H1)(H2) and (TA1)(TA2)).
Figure 3:
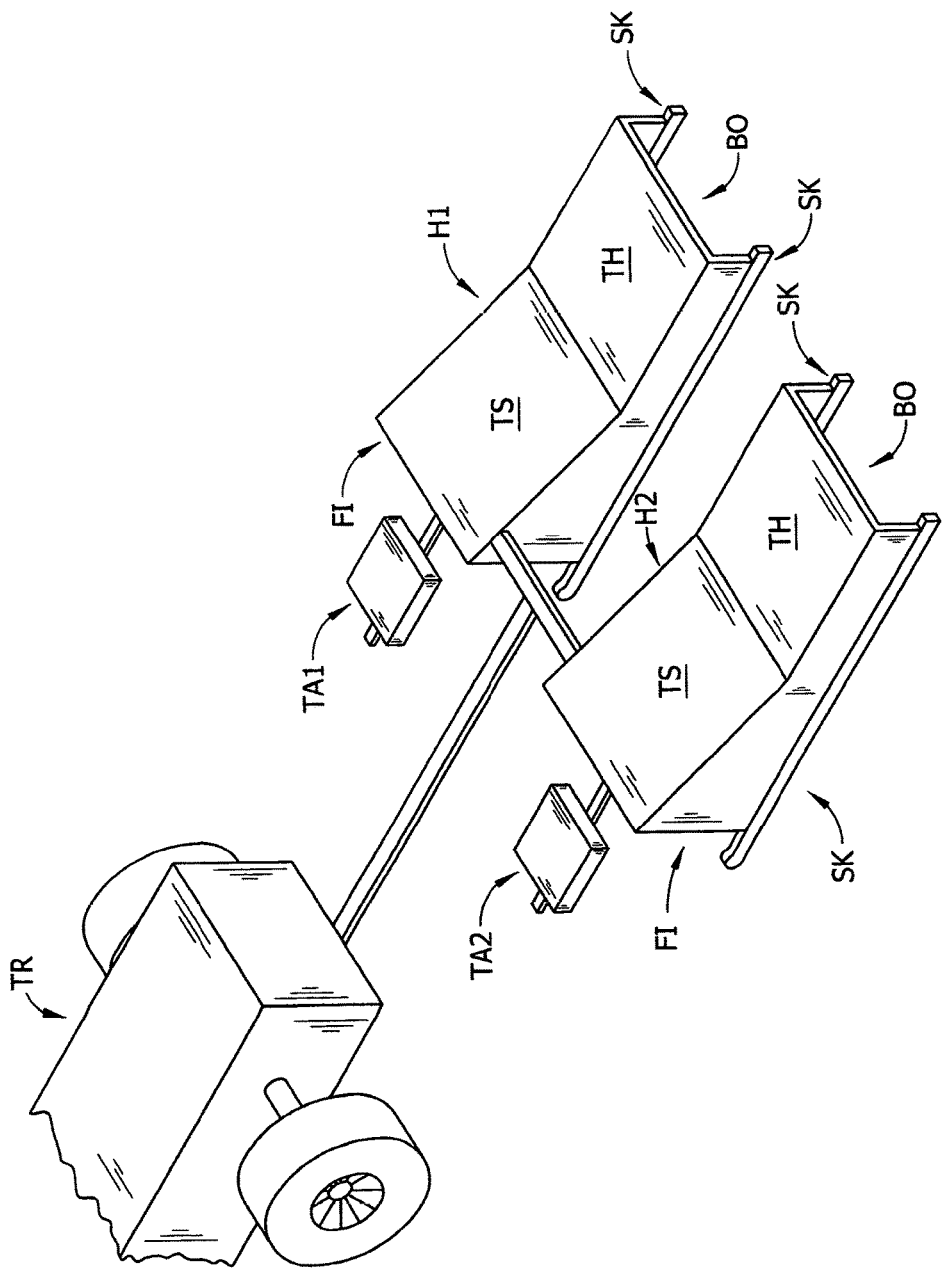
FIG. 3 demonstrates a Tractor (TR) towing two present invention Hood (H) and Torch Assemblies (TA).
Figure 4:
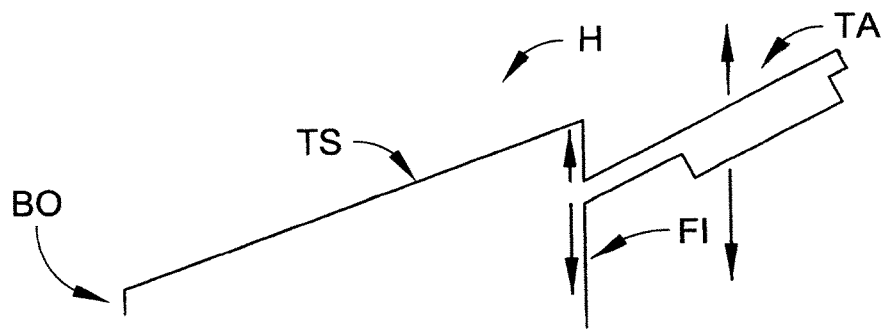
FIG. 4 demonstrates an alternative design for a present invention Hood (H).

Turning now to the Drawings, FIGS. 1-5B are included to provide an insight to Hoods ((H) (H1) (H2) that are used in conjunction with Torches (TA) (TA1) (TA2) in the present invention. FIGS. 1 and 2 show, respectively, three-dimensional and side elevational views of a Hood (H) and Torch Assembly (TA). FIG. 4 shows an alternative Hood (H) in side profile. Note that a closed Top (TS) is present as in the FIG. 2 example, but there is no closed Side shown as present. Further, there is no generally Horizontally oriented Section as in the FIGS. 1 and 2 configurations. It is noted that FIG. 4 actually has become a preferred design based on manufacturing criteria. Note there is indication that the Torch (TA) can be moved up and down with respect to the Hood (H), and that the Hood (H) itself can be moved up and down. This is beneficial when different functions that require wide area flaming, or flaming at the bases of crop plants are to be performed. For instance, where soybeans are treated, it has been found that focusing flames very close to the base of plants causes blossoms to later appear higher up thereon. This aids with harvest as beans, which grow where blossoms appear, located lower on a plant are harder to harvest with typical harvesting equipment.

FIG. 1 shows that said Hood (H) comprises Substantially Open Front Input (FI), (about 1'×1'), Back Output (BO) and Bottom (B) aspects, as well as closed Top (TH) (TS) and Lateral (RS) (LS) sides, said Hood (H) presenting with, as viewed in side elevation, a generally Downward Sloping Section (TS) at the Substantially Open Input (FI) aspect, said generally Downward Sloping Section (TS) merging into a generally Horizontally Oriented Section (TH) at the Substantially Open Output (BO) aspect.

FIG. 2 shows Hood (H) design parameters (D1) (D2) D3) and (D4). Demonstrative non-limiting values therefore are:
D1=610 mm to 1200 mm;
D2=115 mm;
D3=150 mm;
D4=305 mm to 900 mm.

The design criteria for D3 is selected to optimize air entrainment so that heat produced by the Torch Assembly (TA) entry into the Substantially Open Front Input (FI) is optimized. D1 and D4 are selected so that a time of heat provided by said Torch Assembly (TA) and arriving at the Output (BO) of said Hood (H), be at least 0.1 sec.

FIG. 3 demonstrates a Tractor (TR) towing two present invention Hood (H) and Torch Assemblies (TA) behind it, forward. The same identifiers are used as in FIGS. 1 and 2. In addition, it is noted that the identifier (SK) indicates a "Ski" which facilitates sliding over field terrain. Skis affixed to Hoods can be replaced with wheels, perhaps affixed to framework to which a plurality of Hoods are affixed.

Figure 5A:
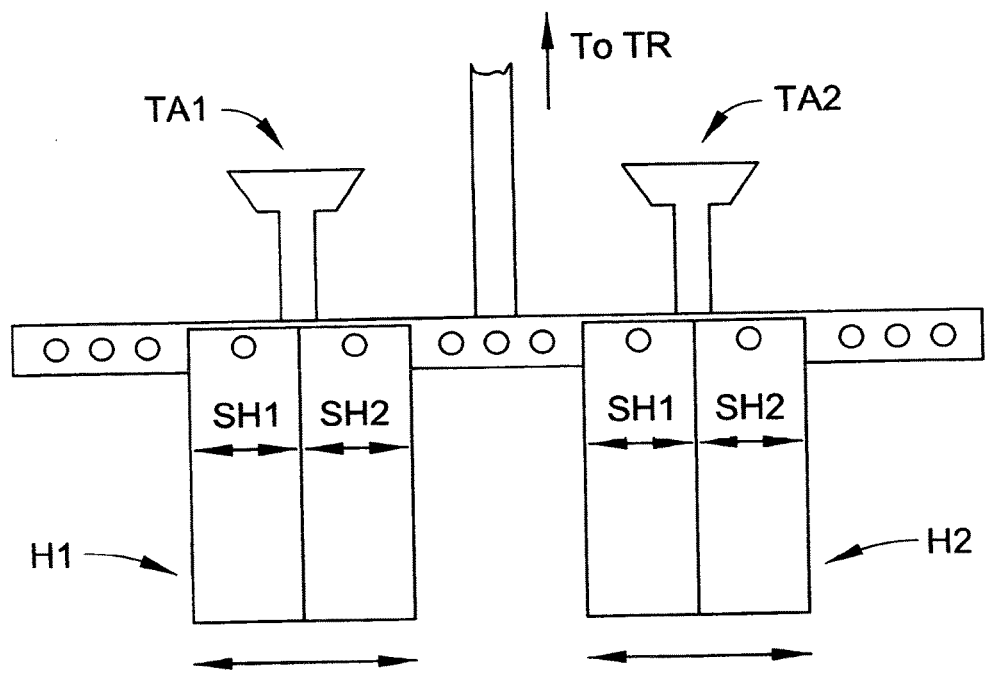
FIG. 5A shows two FIG. 4 Hoods (H1) (H2) in a functional combination.

FIG. 5A shows two FIG. 4 Hoods (H1) (H2) in a functional combination. Note that the closed Top (TS) is comprised of two sheets (SH1) (SH2). One said sheet is sitting atop the other, and said sheets can be slid over one another to adjust the effective width of the combination. In addition, note that the distance between two Hoods (H1) and (H2) can be adjusted. This allows configuring a Multiple Hood Assembly which is customized to a specific crop and field. Arrows are shown to indicate relative sliding of sheets (SH1) (SH2) with respect to one another, so that the width of Hoods (H1) (H2) can be adjusted, and the distance between Hoods (H1) and (H2) can be adjusted. Of course there can be more than two Hoods in an assembly. It is noted that in a multiple Hood assembly, the extreme outer Sheets, (eg. In FIG. 5A under (SH1) of (H1) and under (SH2) of (H2) can have Sides similar to the (RS) in FIG. 2, but that such sides are not necessarily present under more centrally located Sheets, (eg. (SH2) in (H1) and (SH1) in (H2) as shown in FIG. 5A).

Figure 5B:
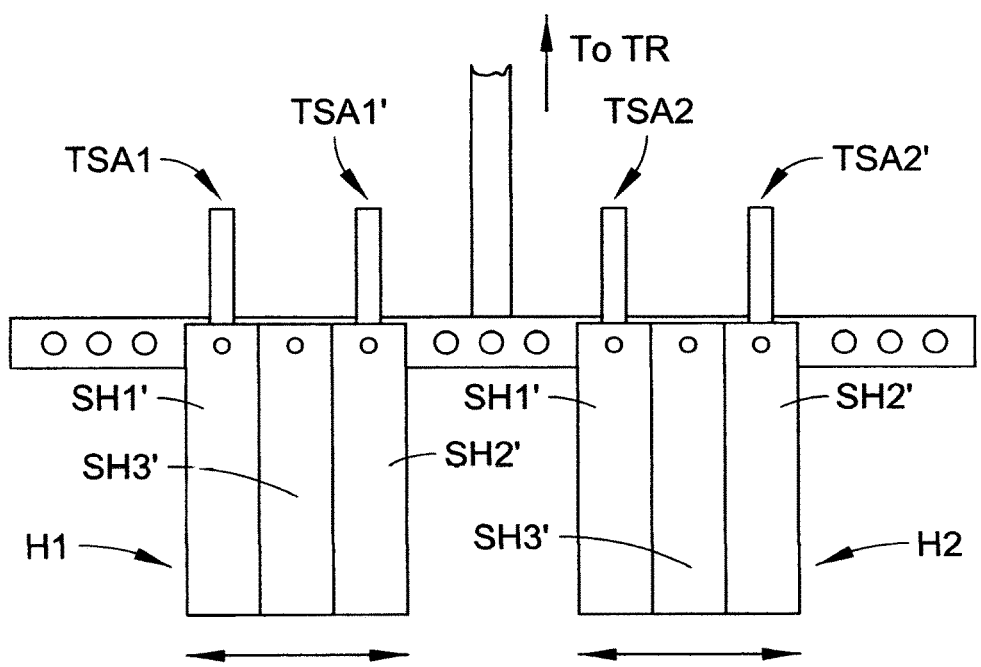
FIG. 5B shows two FIG. 4 Hoods (H1) (H2) in a functional combination, wherein each Hood (H1) (H2) has three top sections (SH1'), (SH2') and (SH3').

FIG. 5B shows two FIG. 4 Hoods (H1) (H2) in a functional combination, wherein each Hood (H1) (H2) has three Top Sections (SH1'), (SH2') and (SH3'). This configuration can be useful where two passes over a field are envisioned. For instance, one pass can be performed with all three Top Sections (SH1'), (SH2') and (SH3') in place before a crop has grown significantly and with the Torches (TA) oriented as are (TA1) and (TA2) as shown in FIG. 3. This allows flame cultivation to be accomplished. After a crop has grown sufficiently it is common to till around the base of the plants. This can be accomplished with a configuration as in FIG. 5B with the middle sections (SH3') removed, leaving (SH1') and SH2') in place. Note that the Torches (TSA1) (TSA1') (TSA2) and TSA2') are rotated from their generally "horizontal orientations" demonstrated in FIGS. 1-5A which orientation, (eg. (TA) (TA1) (TA2) oriented to provide wider dimensions thereof so as to provide larger ground level flaming treatment zones), essentially ninety (90) degrees so that they project generally "vertically", to provide a narrow ground level flaming treatment zone. Further, the Torches (TSA1) (TSA2) (TSA1') (TSA2') can be mounted closer to the ground, as indicated can be done in FIG. 4. Note: it is important to indicate that the terminology "horizontally" and "vertically" is used to only provide a general idea, and is acknowledged as being not quite accurate. This is because a torch, whether oriented to provide a wide or narrow flaming treatment zone at ground level, (ie. have its longer dimension oriented generally "horizontally" or "vertically"), can be tilted about effective "X" and/or "Y" axes to provide a flame locus that approaches the underlying ground at an angle. Further, note that in use (TSA1) and (TSA1') will be positioned on opposite sides of a plant row, as will (TSA2) and (TSA2') to provide banded flaming.

It is noted that when the Top Surface (TS) of a Hood (H) (H1) (H2) as in FIG. 1-5A is substantially closed, its being pulled through a field having relatively tall weeds present serves to "entrap" said weeds, push them down and focus heat from the Torch (TA) (TA1) (TA2) flame thereupon. When a FIG. 5B arrangement is applied with the Middle Top Sections (SH3') present a similar effect is achieved, but it can be less pronounced as the Torches in FIG. 5B are oriented "vertically". FIG. 5B is more appropriately applied in a tilling operation with Sections (SH3) removed so that crop, (eg. corn that has grown to more than about 4" high), can project through the opening created by removing (SH3').

The FIGS. 4, 5A and 5B then show various system specific hood configurations. Various "recipes", (eg. gallons of propane used per acre, time of application of flaming to weeds and/or pests, speed of towing a hood assembly through a field etc.), are applied for flaming specific crops and fields, both in cultivation and tilling operations.

Figure 5C:
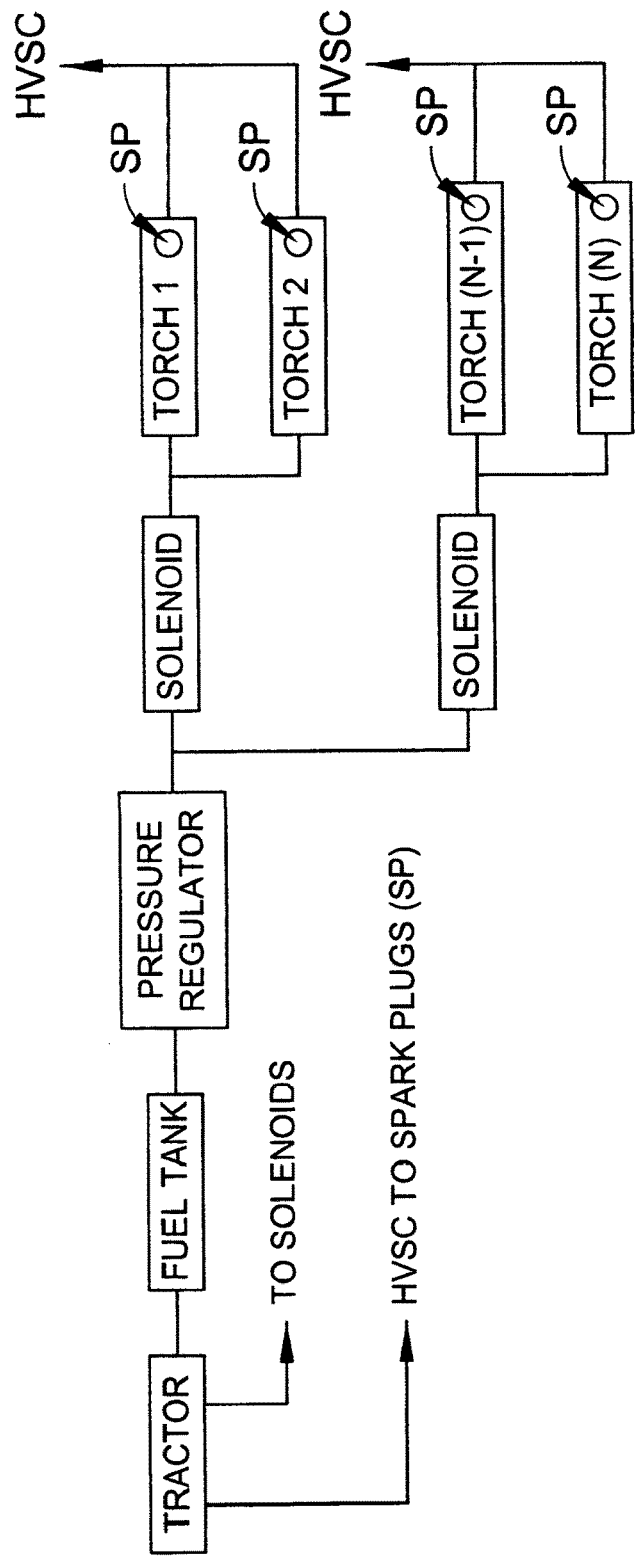
FIG. 5C shows a block diagram of the major functional aspects of a present invention system.

FIG. 5C shows a block diagram of the major functional aspects of a present invention system as it will be applied in actual use. Note that a Tractor, (to be interpreted to include functional equivalents), is present, as is a Fuel Tank, a Pressure Regulator, a Solenoid, and a plurality of Torches (to be understood to include associated Hoods). Note that the Tractor comprises controls that operate the Solenoid and Spark Plugs in the various Torches that are present. Typically Torches are controlled in pairs as shown. It is also noted that while only one Pressure Regulator is shown, there can be separate Pressure Regulators for each Torch or Torch pair. The Torches and Hoods etc. are shown in other Drawings.

Turning now to newly disclosed material, FIGS. 6-21 show various aspects of preferred Torch designs, identified as (TA) and (TA').

Figure 6:
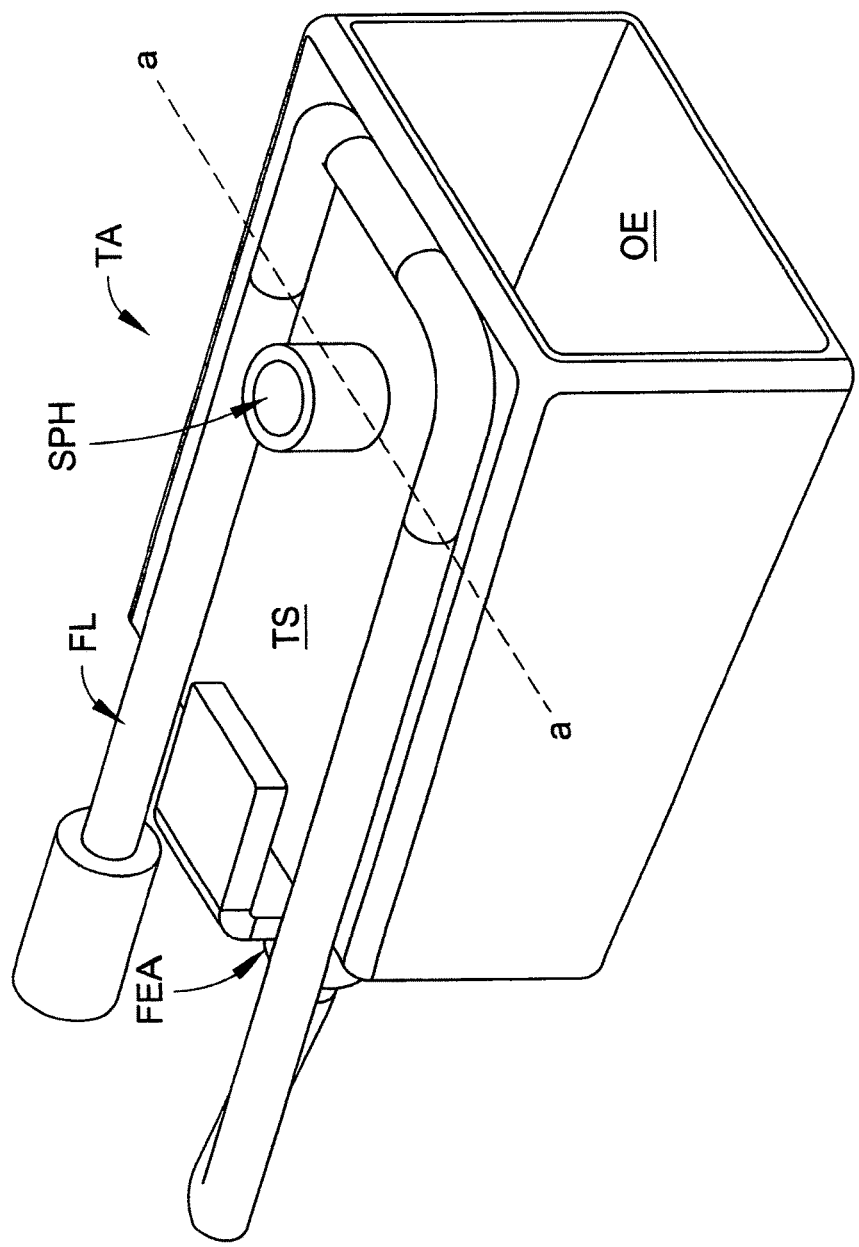
FIG. 6 shows a somewhat perspective view of the Torch (TA) as viewed from above to the left.

FIG. 6 shows a somewhat perspective view of the Torch (TA) as viewed from the atop and to the left thereof. Note the presence of a Fuel Line (FL) affixed to the top surface (TS) of the Torch (TA), and that there is a Spark Plug Hole (SPH) present. In use the Fuel Line (FL) allows heat from combustion hot gases and flames in side the Torch (TA) to enter thereinto and heat fuel to improve combustion of fuel by vaporizing it. Note that the Fuel Line (FL) proceeds along the Torch (TA) on the right side thereof, (viewed as shown), then proceeds to the left substantially parallel to the Open End (OE) thereof and then proceeds back to the Fuel Entering Area (FEA) where it is caused to enter the interior of the Torch (TA). This is exemplary and it is within the scope of the invention for the Fuel Line (FL) to provide additional substantially "U", or other shaped projections over the Top Surface (TS) thereof, or even on the sides or the bottom thereof. In use the Fuel Line (FL) allows heat from the Torch (TA) to enter thereinto and heat fuel, once it is burning fuel, to improve combustion. It is noted that in combination with use of a FIG. 8B Ignition system, this arrangement has been found extremely important in providing a continuous flame, and allowing quickly re-establishing a flame should it, for whatever reason, be extinguished. Known state of the art systems use pilot flames for application is igniting torches rather than a Spark Plug (SP) based ignition system. Application of Spark Plug (SP) based fuel ignition provides great versatility in practical application of the present invention, such as being able to establish a flame when a hood system is being pulled through a field to perform flame cultivation of tilling, extinguishing the flame when turning around at the end of a crop row, and then quickly re-establishing the flame when embarking along another crop row.

While not limiting, it is disclosed that a typical present invention torch (TA) is on the order of 10 inches long, 3.5 inches wide and has an open end depth of about 2.0 inches. Of course, comparison of FIGS. 9-13 and FIGS. 14-18 show that different versions can have different dimensions. For instance, FIGS. 14-18 show a wider open end (OE) dimension than do FIGS. 9-13.

Figure 19G:
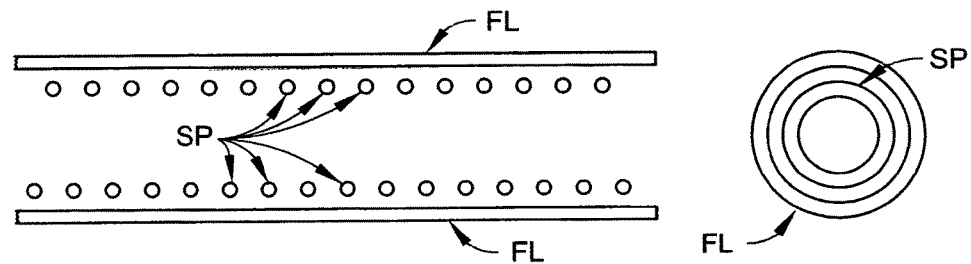
FIG. 19G demonstrates a nozzle (NZ) present on the end of the fuel line (FL), that extends into a torch (TA) (TA1) (TA2).
Figure 19G:
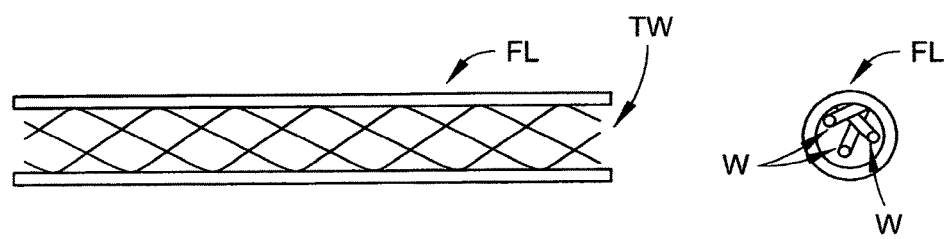
Figure 19G:
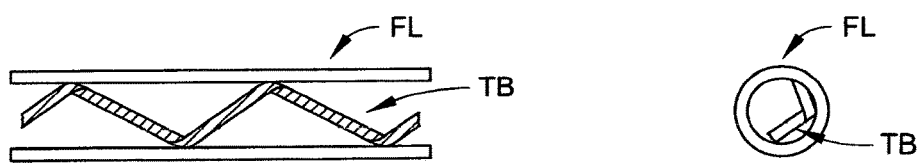
Figure 19G:

FIGS. 19A, 19B (Spring (SP)), 19C, 19D (Twisted Wires (TW)) and 19E, 19F (Twisted Blade (TB)) show that the "swirl" producing element can be a spring (SP) inserted through the inside of the Fuel Line (FL), or can a plurality of Twisted Wires (TW) or a helix shaped Twisted Blade (TB) inserted therethrough. It is noted that a combination of one or more of said elements can be present. In all cases the outer diameter of the element inserted through the Fuel Line (FL) is approximately equal to the inner diameter of the Fuel Line (FL) and the result of the presence thereof is that fuel flowing through the Fuel Line (FL) "swirls" as it flows. This, again, disrupts formation of a heat transfer preventing insulating region around the inner surface of the Fuel Line (FL). FIG. 19G demonstrates a nozzle (NZ) present on the end of the fuel line (FL), that extends into a torch (TA) (TA1) (TA2).

Figure 7:
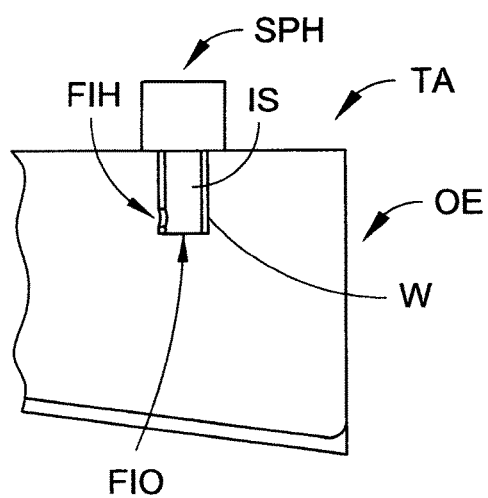
FIGS. 7 and 8A show that below the Spark Plug Hole (SPH) show there extends inside said torch (TA) an ignition system comprising an open bottom internal space (IS) circumscribed by a bluff body wall (W), as viewed from the fuel entry area (FEA).
Figure 8A:
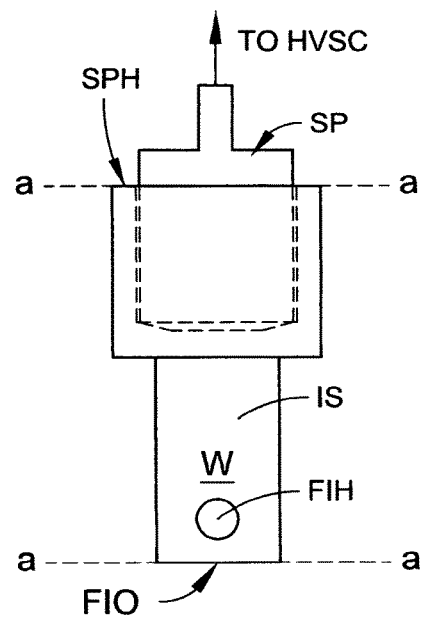
Figure 8B:
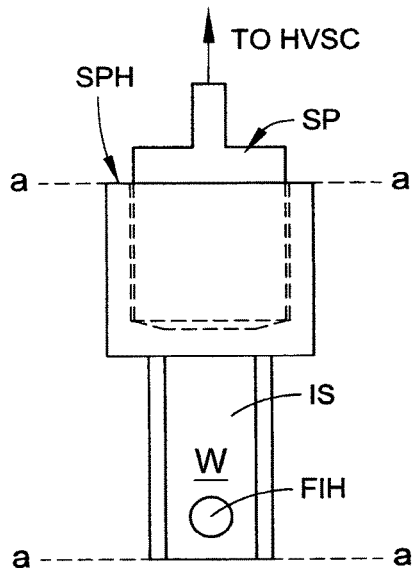
FIG. 8B shows that the bluff body wall (w), as viewed from the open end (OE) of the torch (TA), can be part of a half-tubular shape which is open past the hole (FIH).
Figure 8C:
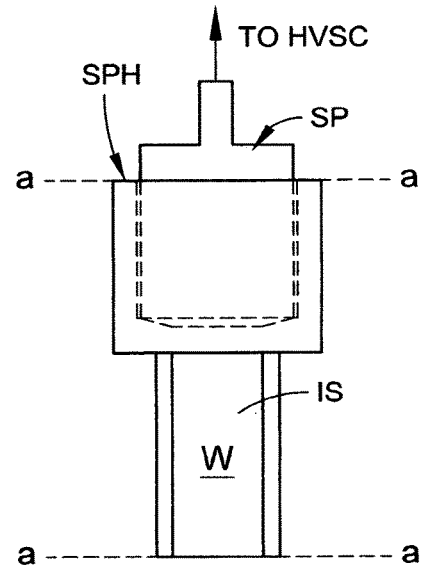
FIG. 8C shows that the bluff body wall (W), as viewed from the open end (OE) of the torch (TA), can be part of a half-tubular shape which has no hole (FIH) in it, as is the case in FIG. 8B.
Figure 9:
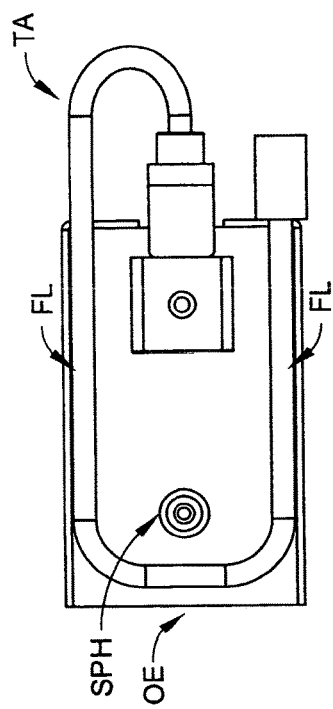
FIGS. 9-13 show more detail for elements (SPH), (FL), (OE), (FEA) etc.
Figure 10:
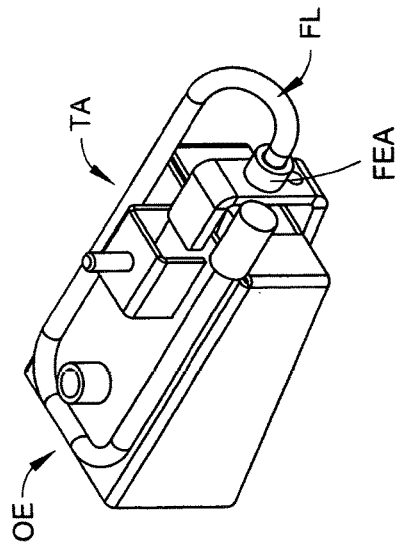
Figure 11:
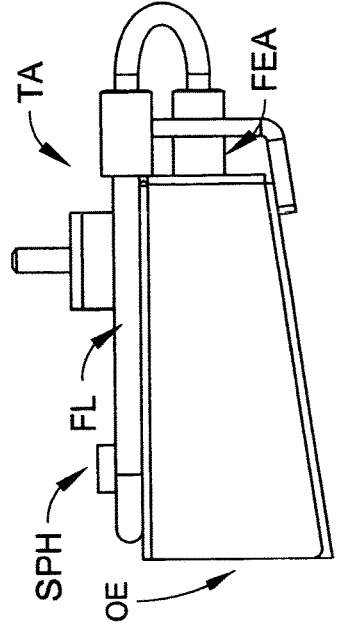
Figure 12:
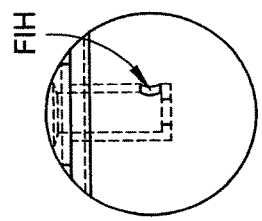
Figure 13:
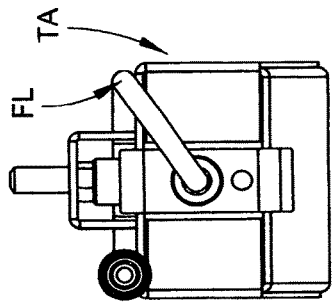

FIGS. 7, 8A, 8B and 8C show that below the Spark Plug Hole (SPH) there extends inside said torch (TA) an ignition system that comprises an internal space (IS) circumscribed by a wall (W), (ie. a bluff body), said ignition system having an open end (FIO) and an end in which is present a spark plug (SPH). Said circumscribed space (IS) further can have a hole (FIH) through said bluff body wall (W), (as viewed from the fuel entry area (FEA) location), through which in use a small amount of fuel enters. Said ignition system further comprises a high voltage spark coil, (HVSC), functionally applied to, during use, provide high voltage to said spark plug. It is noted that the Spark Plug Hole (SPH) is preferably located centrally in the lateral dimension and a bit past center in the longitudinal direction, (eg. from (FEA) to (OE), and that said bluff body wall (W) is typically about an inch long and ¼ to ½ inch wide, (eg. diameter). It is to be understood that the hole (FIH), when present, faces away from the open end (OE) of the Torch (TA) distal from the fuel entry area (FEA), so that a small amount of fuel entered into the Torch (TA) at the Fuel Entry Area (FEA), enters into the circumscribed space (IS) in use and can be easily ignited by operation of a spark plug (see (SP) in FIG. 8A), inserted into said Spark Plug Hole (SPH). FIG. 8B shows that the circumscribed space (IS) can be modified by removing the portion thereof opposite the hole (FIH) through said bluff body wall (W) to form a "semi-circumscribed space", which is open to the inside of the torch (TA) opposite the optional hole (FIH) and generally facing the open end (OE) thereof and away from the fuel entry area (FEA). FIG. 8C shows that the bluff body wall (W), as viewed from the open end (OE) of the torch (TA), can be part of a half-tubular shape which has no hole (FIH) in it, as is the case in FIG. 8B. It is noted that the bluff body wall (W) serves to slow the flow of vaporized fuel streaming toward it from the nozzle at the end of the elongated fuel line (FL) and enables more certain ignition. This is much like how lighting a match in a wind, is much easier if one stands behind a wind breaker.

FIGS. 9-13 show more detail for elements (SPH), (FL), (OE), (FEA) etc. as shown in FIGS. 6-7 for one Torch Design (TA), and FIGS. 14-18 show similar detail for an alternative Torch Design (TA').

It is also noted that fuel to torches is provided through a solenoid valve arrangement that allows quickly establishing and ending flow.

Importantly, the opening for receiving and end of the elongated fuel line (FL) in the Fuel Entry Area (FEA), does not secure said fuel line snugly therewithin, but rather provides an open area therearound, (eg. annular shaped), through which primary air enters to support combustion inside said torch (TA) (TA'). In addition, it is typical practice to attach a Nozzle (NOS) at the end of the Fuel Line (FL) inside a Torch, said Nozzle (NOS) serving to atomize liquid fuel exiting therefrom. Note that before a flame is established inside a Torch, high speed liquid fuel ejects for a nozzle thereinto, but once combustion is established the fuel in the Fuel Line (FL) is caused to be vaporized, and ejects from the nozzle as a high speed gas, which makes combustion more efficient.

It is to be understood that the open end of a Hood (H) (H1) (H2) serves to allow entry of what is termed "secondary air" into the system, and when present a side (eg. (RS) (LS) in FIG. 1) serves to block gusts of wind into the system.

Figure 20A:
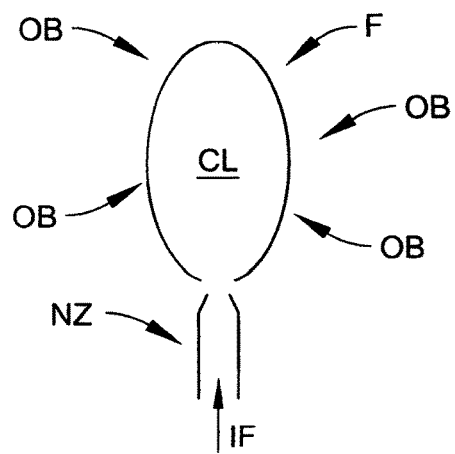
FIG. 20A shows an exemplary Flame (F) emerging from a Nozzle (Nz) fed by Fuel (IF) flowed thereinto.
Figure 20B:
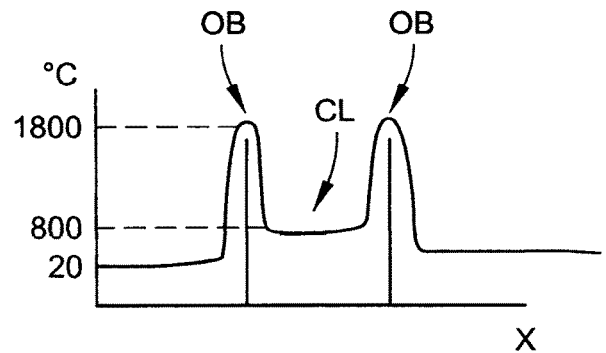
FIG. 20B shows an exemplary graph indicating that a Flame (F) as in FIG. 20A has relatively high temperatures at it's outer boundaries, where the fuel (IF) meets oxygen.

FIG. 20A shows an exemplary Flame (F) emerging from a Nozzle (NZ) fed by Fuel (IF) flowed thereinto. FIG. 20B shows an exemplary graph indicating that a Flame (F) as in FIG. 20A has relatively high temperatures at it's outer boundary locations (OB) where the fuel (IF) meets oxygen, than is present far removed from, or centrally (CL) It can be easily appreciated that greater sensitivity to a loss of flame in a present invention torch (TA) is much greater at a position in the torch corresponding to the exemplary outer boundary (OB) of the flame (F) in FIG. 20A locations.

Figure 20C:
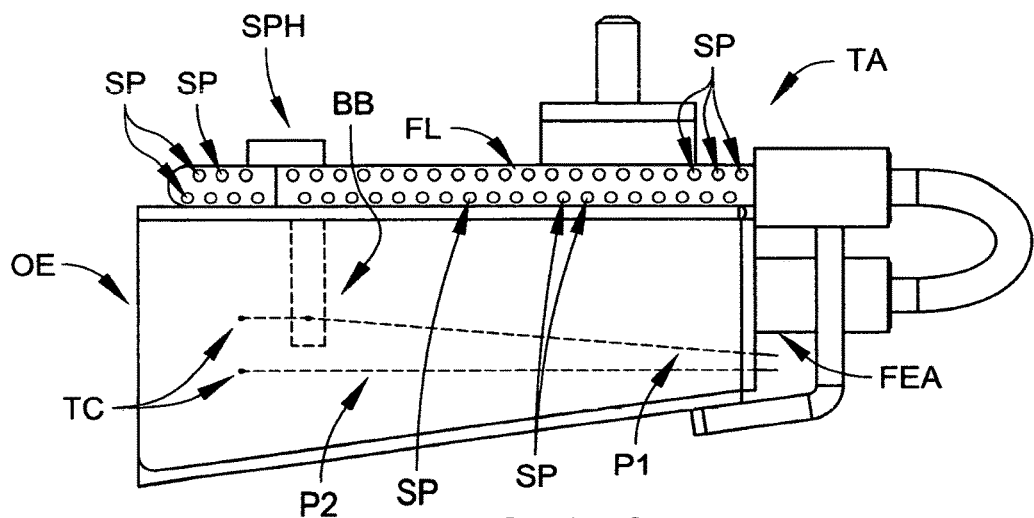
FIG. 20C shows a side view of a a present invention Torch, adapted for FIG. 11 to show the presence of a Bluff Body (BB), with a Thermocouple secured thereto.

FIG. 20C shows a side view of a present invention Torch (TA) showing the combination of elements which distinguish it over prior art. Said FIG. 20C is adapted from FIG. 11, but modified to also show the presence of an exemplary Spring (SP) inside the fuel line (FL), a bluff body (BB) wall, (eg. see (W) in FIG. 8C as gleened from the cross-section in FIG. 6), projecting interiorly into the torch (TA), along with a Thermocouple (TC). One approach to providing a thermocouple involves simply projecting inside into the torch (P2), and another involves positioning a thermocouple (TC) with secure reference to the bluff body (BB). The later is believed completely new, novel and non-obvious. Prior use of thermocouples, even by the Inventors herein, simply placed the thermocouple randomly within the torch (TA). It is now appreciated that benefit is derived from placing the thermocouple in a region of relatively higher temperature inside the torch. Reference to FIG. 20(b) makes clear that positioning the thermocouple in a region of relatively lower temperature can provide less than optimum detectable temperature change information when a flame is extinguished. However, securing the thermocouple to the bluff body wall allows placement to be much more user-adjustable friendly. To elaborate, in practice a user identifies a visible flame zone inside the torch and uses that to empirically guide initial placement of the thermocouple (TC). As the high temperature layer (OB) substantially coincides with the visibly determinable flame zone, it is to be appreciated that many locations within a torch meet that criteria, (see multiple indication of (OB) in FIG. 20a). It is also noted that the high temperature layer (OB) varies with fuel operating pressure. For insight, the inventors performed many experiments and developed a high temperature location pattern for torch configurations used by:

(1) setting the pressure at which fuel enters the fuel line;
(2) visually identifying the flame zone (OB)-(CL)-(OB));
(3) locating the thermocouple (TC) at many locations with respect to said flame zone; and
(4) monitoring thermocouple output.

With the insight achieved by this empirical approach, placement of thermocouples in torches is provided guidance. While not absolutely required, the thermocouple (TC) placement can be dependably secured in use, by affixing it to the bluff body. Affixation of the thermocouple (TC) to the bluff body is especially beneficial, as the flame zone, (eg. (OB)-(CL)-(CL)), is also fixed thereto.

Figure 21:
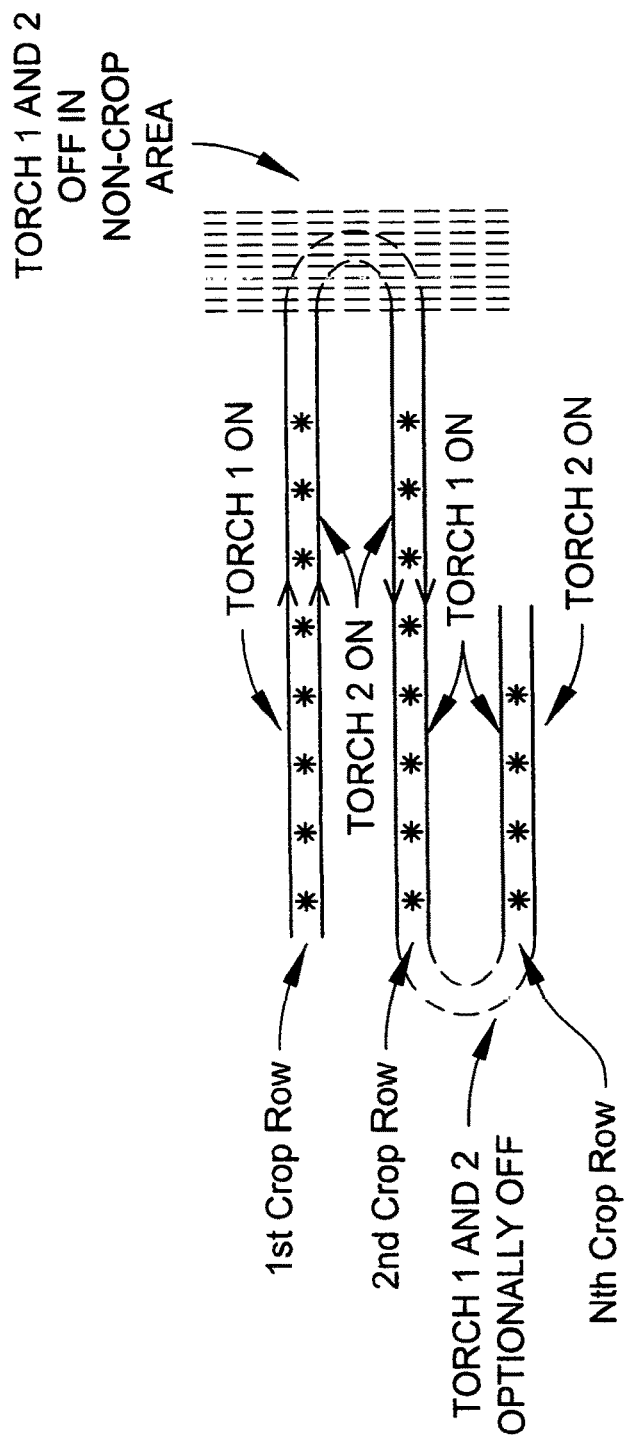
FIG. 21 demonstrates a method of the present invention.

FIG. 21 demonstrates a method of the present invention as presented in the Disclosure of the invention Section of this Specification. Shown are 1st, 2nd and Nth Crop Rows, a Non-Crop area, and indication of when torches are ignited and extinguished during practice.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A torch, said torch having an opening for receiving an end of an elongated fuel line at one end thereof, said received end of said fuel line being attached to a fuel nozzle, said torch further being open at a longitudinally forward distal end thereof, said torch being otherwise substantially closed on top, bottom and left and right sides, said torch being characterized by comprising:

an ignition system comprising a bluff body wall projecting interiorly thereinto from said top, and being positioned forwardly distal from the opening for receiving said fuel line, said ignition system further having an opening in the top for receiving a spark plug;

said ignition system further comprising, during use, a spark plug present in said opening for receiving such, and exterior to said torch, a high voltage spark coil which when functionally applied provides a high voltage to said spark plug; and said elongated fuel line being secured to the outside of said torch such that heat can pass from hot gas and flame inside said torch thereinto during use, said fuel line having a fuel flow swirl producing element therewithin that enters turbulence into fuel passing therethrough to thereby enable efficient transfer of heat from said torch to liquid fuel therewithin by disrupting formation of a gaseous insulating layer between said liquid fuel and the elongated fuel line; and a thermocouple at a location in the torch so that it intercepts a relatively high temperature region of a flame caused to ignite in said torch by application of a spark from said spark plug while fuel is flowing thereinto;

such that in use liquid fuel is caused to flow through said elongated fuel line and exit into the interior of said torch via said nozzle, and such that in use, said ignition system is simultaneously operated to the end that said spark plug causes a spark to occur at a location forwardly distal to the bluff body, said bluff body serving to slow the velocity of said fuel exiting said nozzle such that reliable ignition of said fuel is achieved; and such that said thermocouple senses the presence of a temperature related to the burning of fuel inside said torch, and provides a signal to provide a spark to said spark plug should that temperature significantly decrease while fuel is still flowing, thereby indicating flame extinction.

2. A torch as in claim 1, in which the elongated fuel line is welded to the exterior thereof and the opening for receiving a spark plug is located approximately at a location selected from the group consisting of:

centrally in a lateral direction between said left and right sides, and in said longitudinal direction projecting from said fuel entry opening toward the distal open end of the torch; and other than centrally in a lateral direction between said left and right sides, and in said longitudinal direction projecting from said fuel entry opening toward the distal open end of the torch.

3. A torch as in claim 1, in which the fuel flow swirl is effected by the presence of a spring that is inserted into said elongated fuel line which has an outer dimension substantially equal to an inner dimension of said elongated fuel line.

4. A torch as in claim 1, in which the fuel flow swirl is effected by the presence of a plurality of twisted wires that are inserted into said elongated fuel line that have a combined outer dimension substantially equal to an inner dimension of said elongated fuel line.

5. A torch as in claim 1, in which the fuel flow swirl is effected by the presence of a twisted helical shaped blade that is inserted into the elongate fuel line that has an outer dimension substantially equal to an inner dimension of said elongated fuel line.

6. A torch as in claim 1, in which the thermocouple is affixed to said bluff body.

7. A torch as in claim 1, in which the thermocouple is not affixed to said bluff body.

8. A torch as in claim 1, in which the thermocouple is positioned in said torch guided by empirical results achieved from:
   (1) setting the pressure at which fuel enters the fuel line;
   (2) visually identifying the flame zone (OB)-(CL)-(OB));
   (3) locating the thermocouple (TC) at many locations with respect to said flame zone; and
   (4) monitoring thermocouple output.

9. A torch-hood assembly comprising:
   a hood with substantially open back and front ends, and
      a selection from the group consisting of:
      a closed top and closed sides;
      a closed top and at least one open side; and
      an at least partially open top and closed sides;
   said torch-hood assembly having at least one torch mounted at the back thereof for producing flame and directing it into said substantially open back end of said hood, said torch having an opening for receiving an end of an elongated fuel line at one end thereof, said received end of said fuel line being attached to a fuel nozzle, said torch further being open at a longitudinally forward distal end thereof, said torch being otherwise substantially closed on top, bottom and left and right sides, said torch being characterized by comprising:
   an ignition system comprising a bluff body wall projecting interiorly thereinto from said top, and being positioned forwardly distal from the opening for receiving said fuel line, said ignition system further having an opening in the top for receiving a spark plug;
   said ignition system further comprising, during use, a spark plug present in said opening for receiving such, and exterior to said torch, a high voltage spark coil which when functionally applied provides a high voltage to said spark plug; and
   said elongated fuel line being secured to the outside of said torch such that heat can pass from hot gas and flame inside said torch thereinto during use, said fuel line having a fuel flow swirl producing element therewithin that enters turbulence into fuel passing therethrough to thereby enable efficient transfer of heat from said torch to liquid fuel therewithin by disrupting formation of a gaseous insulating layer between said liquid fuel and the elongated fuel line; and
      a thermocouple at a location in the torch so that it intercepts a relatively high temperature region of a flame caused to ignite in said torch by application of a spark from said spark plug while fuel is flowing thereinto;
   such that in use liquid fuel is caused to flow through said elongated fuel line and exit into the interior of said torch via said nozzle, and such that in use, said ignition system is simultaneously operated to the end that said spark plug causes a spark to occur at a location forwardly distal to the bluff body, said bluff body serving to slow the velocity of said fuel exiting said nozzle such that reliable ignition of said fuel is achieved; and
   such that said thermocouple which is secured in position with respect to said bluff wall, senses the presence of a temperature related to the burning of fuel inside said torch, and provides a signal to provide a spark to said spark plug should that temperature significantly decrease while fuel is still flowing, thereby indicating flame extinction.

10. A torch-hood assembly as in claim 9, in which the elongated fuel line is welded to the exterior of said at least one torch and the opening for receiving a spark plug is located approximately centrally in a lateral direction between said left and right sides, and in said longitudinal direction projecting from said fuel entry opening toward the distal open end of the torch.

11. A torch-hood assembly as in claim 9, in which the fuel flow swirl in said at least one torch fuel line is effected by the presence of a spring that is inserted into said elongated fuel line which has an outer dimension substantially equal to an inner dimension of said elongated fuel line.

12. A torch-hood as in claim 9, in which the fuel flow swirl in said at least one torch fuel line is effected by the presence of a plurality of twisted wires that are inserted into said elongated fuel line that have a combined outer dimension substantially equal to an inner dimension of said elongated fuel line.

13. A torch-hood assembly as in claim 9, in which the fuel flow swirl in said at least one torch fuel line is effected by the presence of a twisted helical shaped blade that is inserted into the elongate fuel line that has an outer dimension substantially equal to an inner dimension of said elongated fuel line.

14. A torch as in claim 9, in which the thermocouple is affixed to said bluff body.

15. A torch as in claim 9, in which the thermocouple is not affixed to said bluff body.

16. A torch as in claim 9, in which the thermocouple is positioned in said torch under the guidance of empirical results achieved by:
   (1) setting the pressure at which fuel enters the fuel line;
   (2) visually identifying the flame zone (OB)-(CL)-(OB));
   (3) locating the thermocouple (TC) at many locations with respect to said flame zone; and
   (4) monitoring thermocouple output.

17. A torch, said torch having an opening for receiving an end of an elongated fuel line at one end thereof, said received end of said fuel line being attached to a fuel nozzle, said torch further being open at a longitudinally forward distal end thereof, said torch being otherwise substantially closed on top, bottom and left and right sides, said torch being characterized by comprising:
   an ignition system comprising a bluff body wall projecting interiorly thereinto from said top, and being positioned forwardly distal from the opening for receiving said fuel line, said ignition system further having an opening in the top for receiving a spark plug;
   said ignition system further comprising, during use, a spark plug present in said opening for receiving such, and exterior to said torch, a high voltage spark coil which when functionally applied provides a high voltage to said spark plug; and
   said elongated fuel line being secured to the outside of said torch such that heat can pass from hot gas and flame inside said torch thereinto during use, said fuel line having a fuel flow swirl producing element therewithin that enters turbulence into fuel passing therethrough to thereby enable efficient transfer of heat from said torch to liquid fuel therewithin by disrupting formation of a gaseous insulating layer between said liquid fuel and the elongated fuel line; and
   a thermocouple at a location in the torch so that it intercepts a relatively high temperature region of a flame caused to ignite in said torch by application of a spark from said spark plug while fuel is flowing thereinto;
   such that in use liquid fuel is caused to flow through said elongated fuel line and exit into the interior of said torch via said nozzle, and such that in use, said ignition system is simultaneously operated to the end that said spark plug causes a spark to occur at a location forwardly distal to the bluff body, said bluff body serving to slow the velocity of said fuel exiting said nozzle such that reliable ignition of said fuel is achieved; and such that said thermocouple senses the presence of a temperature related to the burning of fuel inside said torch, and provides a signal to provide a spark to said spark plug should that temperature significantly decrease while fuel is still flowing, thereby indicating flame extinction; and said torch being distinguished in that said thermocouple is affixed to said bluff body and is positioned in said torch at a position at or near a location therein at which the highest temperature is achieved for a set of given conditions, said location of highest temperature being determined empirically by a procedure of repeatedly:

(1) setting the pressure at which fuel enters the fuel line;
   (2) visually identifying the flame zone (OB)-(CL)-(OB));
   (3) locating the thermocouple (TC) at many locations with respect to said flame zone; and
   (4) monitoring thermocouple output;

followed by examining data provided by said procedure to determine the highest temperature location.

\* \* \* \* \*